United States Patent

[11] 3,572,509

[72] Inventor Rolland W. Dexter
 San Diego, Calif.
[21] Appl. No. 834,659
[22] Filed June 19, 1969
[45] Patented Mar. 30, 1971
[73] Assignee Auto-Life Products Inc.
 San Diego, Calif.

[54] TISSUE ROLL OIL FILTER ASSEMBLY
 6 Claims, 5 Drawing Figs.
[52] U.S. Cl. .................................................. 210/130,
 210/439, 210/494
[51] Int. Cl. ..................................................... B01d 35/14,
 B01d 27/10
[50] Field of Search............................................ 210/130,
 132, 438, 439, 494

[56] References Cited
 UNITED STATES PATENTS

| | | | |
|---|---|---|---|
| 2,110,009 | 3/1938 | Weidenbacker............. | 210/131 |
| 3,308,956 | 3/1967 | Yee, et al...................... | 210/439X |
| 3,346,120 | 10/1967 | Russo, et al.................. | 210/439 |
| 3,405,805 | 10/1968 | Hatter........................... | 210/130 |

*Primary Examiner*—Frank A. Spear, Jr.
*Attorney*—Carl R. Brown

ABSTRACT: A full flow oil filter that uses a roll type, disposable tissue cartridge and that employs "spin on" external attachment to an existing engine and that has a resiliently biased, valve controlled, bypass means for providing continuous oil flow notwithstanding possible oil flow stoppage through the tissue cartridge and that has structure for providing gradient density filtering by the tissue cartridge.

Patented March 30, 1971 3,572,509

INVENTOR.
ROLLAND W. DEXTER

BY *Carl R. Brown*

ATTORNEY

TISSUE ROLL OIL FILTER ASSEMBLY

BACKGROUND OF THE INVENTION

Many advantages have become apparent in the use of disposable tissue cartridge oil filters over conventional cartridge oil filters. The tissue cartridge such as the well-known roll of toilet tissue, provides a much improved filtering action and is relatively inexpensive to replace. However, most automobiles built by the major car manufactures use conventional filter elements with conventional-type cartridges for fitting onto well-known adaptions on the engines of the automobiles. Thus while it is advantageous to use a tissue cartridge oil filter, the known tissue cartridge oil filters require that special adaptations be installed on the engines. These special adaptations usually comprise drilling holes in the block of the engine and installing special connecting tubes. So while many persons would prefer to use disposable tissue cartridge oil filters, they are reluctant to make such changes to their automobile engines and this has restricted the use of disposable tissue cartridge oil filters.

Other facts that have discouraged the use of tissue cartridge oil filters are that portion of the tissue used in tissue cartridge oil filters are often thought to be disposed to breaking off and passing into the oil system. Should this occur, then such bits of tissue could clog the screens in oil pumps and could lead stoppage in oil flow in the engine. While one of the primary advantages of the tissue cartridge filter is that the oil passes through the entire longitudinal length of the tissue cartridges, as distinct from conventional filter cartridges where the oil usually passes radially through the side of the cartridges, this improved filtering coupled with excessively long use of the tissue cartridge without replacement can possibly result in stoppage of oil flow through the filter element and thus through the engine. To alleviate this problem, one known tissue cartridge filter employs passages for bypassing oil from passing through the filter should blockage occur. However, the open passages allow a certain amount of unfiltered oil to be constantly returned to the engine whether or not there is blockage in the tissue cartridge. Also the roll tissue paper cartridge acts substantially as a uniform density filter when oil flows through it longitudinally. This can allow or cause sediment and impurities to build up at the input end of the filter cartridge, and thus reduce the cartridges filtering capability.

Accordingly it is advantageous to have an oil filter using a roll-type disposable tissue cartridge that can be easily and quickly installed on existing engines without modification, that bypasses the passage of oil through the filter only if blockage in the filter occurs, and that provides gradient density filtering through the roll tissue cartridge filter.

SUMMARY OF THE INVENTION

An exemplary embodiment of the roll-type, disposable tissue cartridge oil filter of this invention comprises a tappered cylindrical housing that is closed at one end and that is open at the other end and that has an internal diameter at the closed end that is smaller than the outer diameter of the roll tissue and has an internal diameter at the open end that is slightly larger than the outer diameter of the roll tissue. An end cap closes the open end and has a plurality of holes for passing oil into the volume of the housing and a center opening that returns the filtered oil to the engine's oil system. A tubular member, that is secured axially in the housing, supports the tissue paper cartridge and has bypass openings in the end adjacent the end cap. These bypass holes function to provide sufficient oil to lubricate the engine in case of interruption of oil flow through the cartridge, should an oil flow blockage occur. A regulating valve, employing a spring fitted inside the tube, prevents oil flow through the bypass holes as long as the oil continues to flow through the cartridge. Should a total or partial flow blockage occur, then the oil pressure bearing on the pressure regulator valve will cause it to open allowing oil to bypass the tissue paper cartridge. When the pressure returns to normal, the value valve will once again close bypass oil path forcing the oil to travel through the cartridge. A ring that is positioned around the tube at the end adjacent to the closed end of the housing and the tappered inside surface of the housing, causes the tissue paper cartridge to be compressed at the end opposite the intake holes and allows radial expansion of the end of the cartridge adjacent the intake holes. The tissue paper cartridge then becomes, in effect, a variable density filter. This allows sediment to be better distributed throughout the longitudinal length of the filter.

It is therefore an object of this invention to provide a new and improved tissue cartridge oil filter.

It is another object of this invention to provide a new and improved disposable, tissue cartridge oil filter that many be easily installed upon existing engines without requiring additional connection apparatus.

It is another object of this invention to provide a new and improved disposable, tissue cartridge oil filter that prevents pieces of the tissue from flowing with the filtered oil into the engine's oil system.

It is another object of this invention to provide a new and improved disposable, tissue cartridge oil filter having means for varying the filtering density of the tissue paper cartridge along its axis.

It is another object of this invention to provide a new and improved disposable, tissue cartridge oil filter with efficient filtering action throughout the life of the tissue paper cartridge.

It is another object of this invention to provide a new and improved disposable, tissue cartridge oil filter having means for self regulating the bypassage of oil should a blockage of the oil flow through the filtering tissue cartridge occur.

It is another object of this invention to provide a new and improved disposable, tissue cartridge oil filter that has means for maintaining a constant differential pressure notwithstanding the blockage of the tissue roll or minor pressure variations of an external oil pump.

It is another object of this invention to provide a new and improved disposable, tissue cartridge oil filter that is inexpensive to make, simple and easy to assemble, disassemble and clean, that may be installed on existing vehicles, uses an inexpensive filtering cartridge, and that provides improved oil filtering over conventional-type oil filters.

Other objects, novel features, and advantages of this invention will become more apparent upon a review of the following detailed specification and the attached drawing in which like reference numerals designate like parts throughout and in which.

Figure 1:
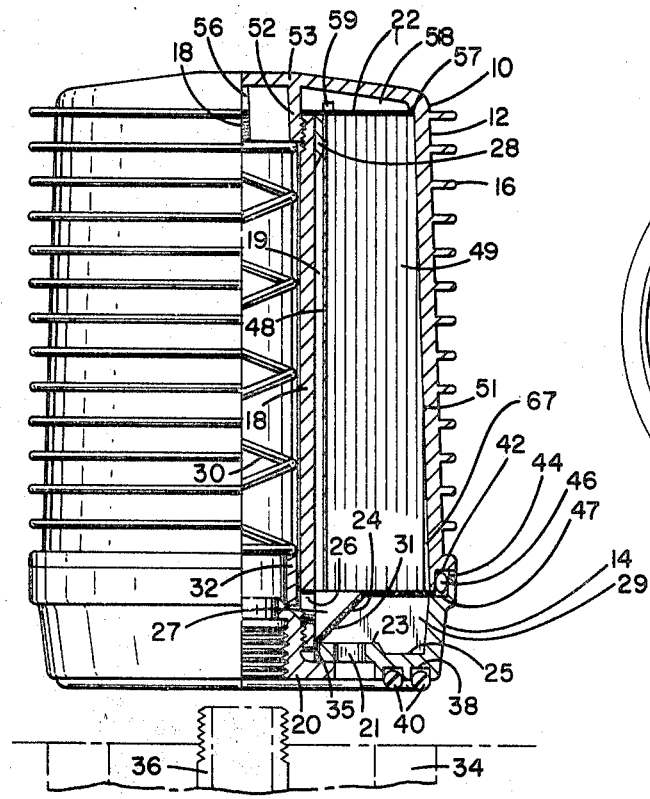
FIG. 1 is a side view with parts in section of an embodiment of this invention.

Referring now to FIGS. 1, 2, 3, 4 and 5, the embodiment of the tissue cartridge oil filter 10 comprises a housing 12 with an end cap 14. The housing 12 has a tappered cylindrical shape and may be made of aluminum or other suitable material and has cooling vanes 16. The cylindrical housing has an inner surface 51 with an average diameter that is substantially the same as the outer diameter of a normal roll of toilet tissue paper or a normal roll of tissue paper with an outer radial part of the tissue removed to decrease its outer diameter. It may be understood that in this invention, it is particularly advantageous to use a roll of toilet tissue paper as an oil filtering cartridge. However, it should be recognized that other suitable roll-type filtering material in the form of a disposable cartridge may also be used.

A threaded tubular projection 52 that is integral with the upper inner surface end 53 of the housing 12 threadably engages with a cylindrical sleeve 18. End cap 14 is secured to housing 12 by connecting nut 20 which bears on end cap 14 and screws into the threaded end of the tubular element 18. Radially directed ribs 29 consisting of an angled segment 31 and an upper flat are integrally secured to surfaces 23 and 25 of end cap 14. A circular shaped filter screen 24 rests upon the upper surface of the ribs 29 with its outer circumference positioned between surface 47 and the end of housing 12. The filter screen 24 has a conical portion that rests on surfaces 31 with a lower lip 35 that is held between sleeve 18 and end cap 14. The shaped filter screen 24 filters out large impurities from the oil received through opening 21 in the raised portion 23 and also filters any oil that passes through bypass holes 26.

Figure 2:
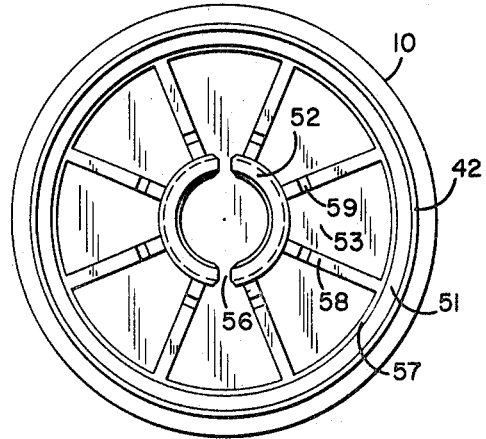
FIG. 2 is an end view of the inside surface of the housing of the embodiment of the invention.
Figure 4:
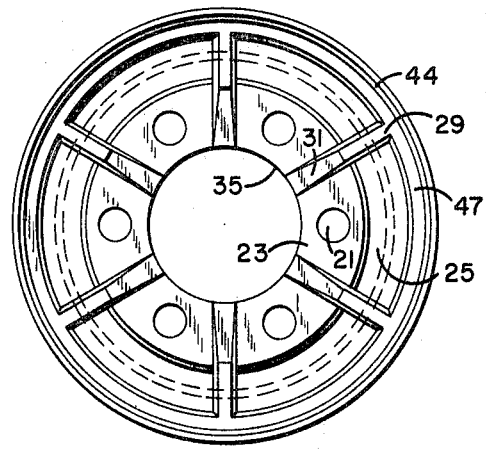
FIG. 4 is an inside end view of the end cap of the embodiment of the invention.
Figure 5:
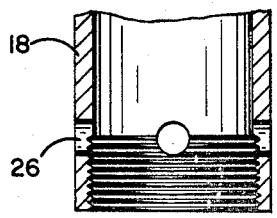
FIG. 5 is a side view in section of a portion of the cylindrical sleeve of the embodiment of the invention.
Figure 3:
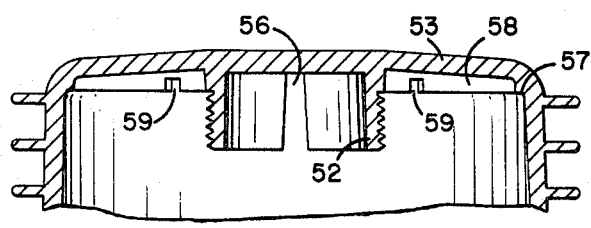
FIG. 3 is a side view in section with parts broken away of the inside surface of the housing of the embodiment of the invention.

The inner surface of the closed end 53 of the housing 12 has spaced ridges 58, see FIGS. 1, 2 and 3. A flat filter screen 22 rests on these ridges 58 and against shoulder 57 AND filters oil passing through the filtering roll of tissue paper 49, preventing particles of tissue paper from being carried by the oil flow into the hollow passage of cylinder 18. A ring 28 is secured coaxially about tubular member 18 in any suitable manner, such as by a suitable adhesive. Ring 28 functions to compress the end of the roll of tissue paper 49 to a greater extent than the other end of the roll of tissue paper 49, thus reducing the spacing between layers of the tissue paper and providing a gradient filtering action of the oil passing through the roll of tissue paper 49.

A compression spring 30 is positioned in cylinder 18 and bears at one end on the end of the threaded tubular projection 52 of the housing 12 and at the other end of the pressure control valve 32. The end cap member 14 has an outer configuration for particularly mating with and coacting with a known structure shown in phantom, on existing vehicles that carries the oil to be cleaned to and from the oil filter 10. Such installations on existing vehicles normally comprise an outer ring shaped member 34 and an internal conduit 36. The conduit 36 has a threaded end that coacts with the inner threads of connecting nut 20. The oil to be cleaned passes through the volume between the inner surface of the outer ring member 34 and the outer surface of the output oil line 36. Coaxial cylindrical recesses 38 in the outer surface of end cap 14 are provided with circular O-rings 40 that seal the connection between the external engine and filter 10. Protection against leakage within filter 10 is provided by annular surfaces 42 and 44 that compress O-ring 46.

The oil flows into the inner cavity of the assembled oil filter 10 through inlet holes 21. The filtered oil flows out of the filter through the centered opening in the connecting nut 20. Bypass passages 26 carry oil directly from the input cavity to a space below the lower end of the valve ring 32. Should the filtering process passages through the roll of tissue paper become plugged sufficiently to prevent normal oil flow therethrough, then the pressure of the oil from the oil pump will build up in the space below valve ring 32 to a sufficient pressure to raise ring 32 against the force of spring 30. Oil can then pass through openings 26 to the discharge valve of sleeve 18 in sufficient quantities to prevent injury to the engine. The force of spring 30 is set to provide pressure release of oil through openings 26 only when the passage of oil through the filtering cartridge 49 is sufficiently restricted to cause damage to the engine.

The extent of travel of the internal cardboard sleeve 48 is limited by screen 22, which bears on ridges 58 and is prevented from motion toward the inlet cavity 27 by means of filter screen 24 and rib segments 29. Protruding threaded tubular member 52 contains two slots 56 which allow oil to flow from hollow cavities between ridges 58 through sleeve 18. Ridges 58 have notches 59 to allow flow of filtered oil between the cavities and through slots 56.

OPERATION

In operation, the embodiment of this invention is assembled substantially as illustrated in FIG. 1 with a roll tissue cartridge 49 inserted within the cylindrical housing 12 and the end cap 14 secured to said housing 12. The connecting nut 20 is fed through the end cap 14 and screwed into the return tube 18. The connecting nut 20 bears on pressure regulating valve 32 compressing spring 30. The end of the tissue cartridge opposite the open end of housing 12 is squeezed by the sealing ring 28 and the inner surface of the housing 12, with the other end of the cartridge 49 being substantially noncompressed. The entire structure is then "spun-on" to the existing engine oil connections by the internal threads of connecting nut 20 compressing O-rings 40 between end cap 14 and engine structure 34. The oil flows in through inlet holes 21 and flows through the entire length of the filtering roll tissue 49 into the spaces between ridges 58 and communicates between all such spaces through notches 59. The oil then flows into sleeve 18 through slots 56.

In normal operation the oil flow normally flows through the filter cartridge 49 and no oil flows through the smaller bypass passages 26 in the absence of partial or total oil flow stoppage in the filter cartridge 49. Should there be a partial or total stoppage of oil flow through the filter cartridge 49 and the oil and the pressure head in cavity 27 is greater than the combination of the pressure in the sleeve 18 plus the compression force of the spring times the area of the edge of the pressure-regulating ring 32, then the pressure-regulating ring 32 will compress spring 30 allowing oil to pass through the bypass passages 26. If the pressure in cavity 29 becomes less than the pressure within the return tube plus the force of the spring times the area of the end surface of the control-regulating ring 32, then the control-regulating ring will return closing off the passages formed by holes 26 and connecting nut 20.

The diameter of the housing in the illustrative embodiment decreases with an approximate ¼ inch taper along the length of the cartridge from the open end to the closed end providing a variation of filter density along the length of the tissue paper cartridge. This gives the filter cartridge an increasing filtering density along its length that allows impurities in the oil to be carried upward into the center of the tissue filter and be distributed throughout the entire length of the filter rather than being concentrated at the end adjacent the end cap 14. Also when the oil flows through the filter 49, the end of the tissue paper cartridge tends to expand adjacent the oil inlet into the cavities 19 and 67 further increasing the filter density effect.

I claim:

1. A tissue roll oil filter assembly comprising:
   a hollow housing having an opening in one end for holding a tissue roll;
   an end cap for closing said opening, which cap has inlet and outlet holes;
   means in said housing for directing oil flow through said tissue roll from said inlet holes to said outlet hole;
   at least one bypass channel interconnecting said inlet and outlet holes for bypassing oil from passing through the tissue roll;
   valve means for opening said bypass channel only when the oil pressure in said inlet holes exceeds a given pressure;
   said oil flow-directing means includes a tube positioned axially in said housing;
   said tissue roll oil filter having a centered opening that fits over said tube in the operative position, whereby the oil flows from said inlet holes longitudinally through said tissue roll and through the internal volume of said tube to said outlet hole;
   said tube has openings adjacent said inlet and outlet holes;
   said valve means includes a valve that controls oil flow through said tube openings;
   said valve comprises a sleeve that is capable of moving vertically in said tube between said first and second positions, and in said first position said sleeve closes off oil flow through said tube openings;

resilient biasing means for biasing said sleeve to said first position;

an internal valve seat positioned in said tube adjacent said tube openings for coacting with the internal edge of one end of said sleeve in said first position for preventing oil flow through said tube openings and into said tube;

the oil passing through said inlet holes passes through said tube openings to contact the remaining area of the said one end of said sleeve, whereby when the oil pressure exceeds a given pressure, the force on said end area moves said sleeve against said resilient biasing means from said first position to said second position;

said resilient biasing means comprises a spiral spring that fits in said tube and bears against the other end of said sleeve;

the closed end of said housing has a centered open projection that threadably engages one end of said tube; and the other end of said spring bears against said projection.

2. A tissue roll oil filter as claimed in claim 1 in which, said centered projection has openings through its sides for passing oil from said tissue roll to an internal passage in said tube.

3. A tissue roll oil filter as claimed in claim 2 in which:

said closed end of said housing has radially directed ribs against which one end of said tissue roll abuts in the operative position;

a filter screen positioned between said ribs and tissue roll; and each of said ribs have at least one opening therethrough for passing oil flow.

4. A tissue roll oil filter comprising:

a hollow housing having an opening in one end for holding a tissue roll;

an end cap for closing said opening, which cap has inlet and outlet holes;

means in said housing for directing oil flow through said tissue roll from said inlet holes to said outlet hole;

at least one bypass channel interconnecting said inlet and outlet holes for bypassing oil from passing through the tissue roll;

valve means for opening said bypass channel only when the oil pressure in said inlet holes exceeds a given pressure;

said oil flow directing means includes a tube positioned axially in said housing;

said tissue roll oil filter having a centered opening that fits over said tube in the operative position, whereby the oil flows from said inlet holes longitudinally through said tissue roll and through the internal volume of said tube to said outlet hole;

said tube has openings adjacent said inlet and outlet holes, said valve means includes a pressure responsive valve that controls oil flow through said tube opening; and the inner surface of said housing having progressively increase in diameter from said closed end to said open end, whereby said tissue roll is progressively squeezed radially inwardly along substantially the longitudinal length thereof providing a filter having an increasing density from said inlet holes to said outlet holes.

5. A tissue roll oil filter as claimed in claim 4 in which, the radial distance between the outer surface of said tube and the inner surface of said housing adjacent the closed end of said housing is less than the radial distance between the outer surface of said tube and the inner surface of said housing adjacent the open end of said housing, whereby the end of the tissue roll adjacent said closed end of said housing is radially squeezed between said housing and said tube and the other end of the tissue roll is capable of radial expansion.

6. A tissue roll oil filter as claimed in claim 5 in which, the end of said tube adjacent the closed end of said cylinder has a larger outer circumference than the end of said tube adjacent said open end of said cylinder.